Feb. 24, 1959
G. S. MONK
2,875,346
OVERALL OPTICAL VIEWER
Filed April 25, 1946
5 Sheets-Sheet 4
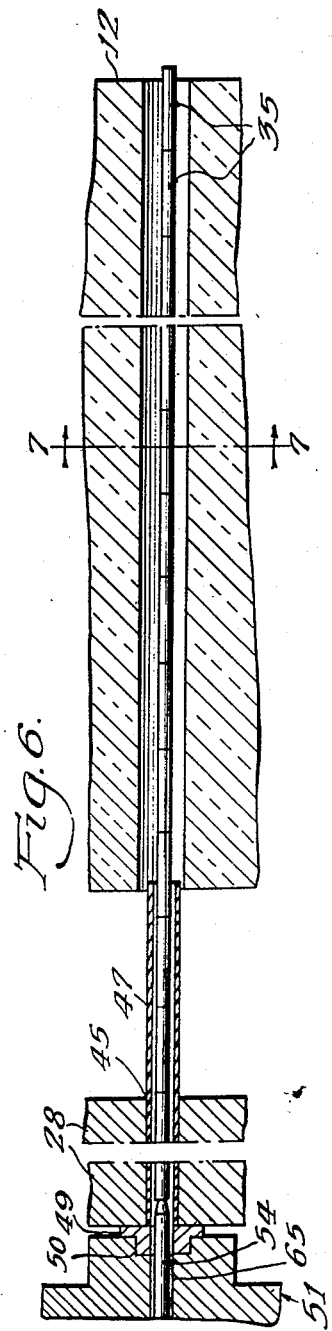
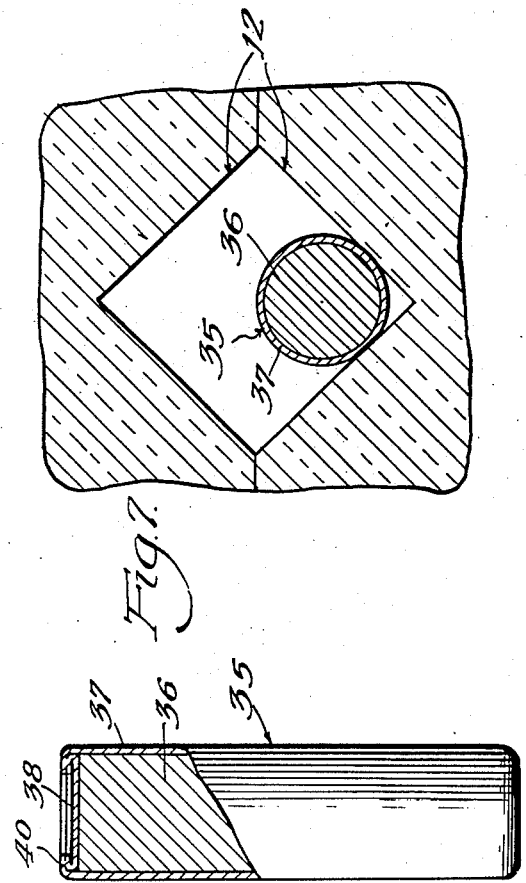
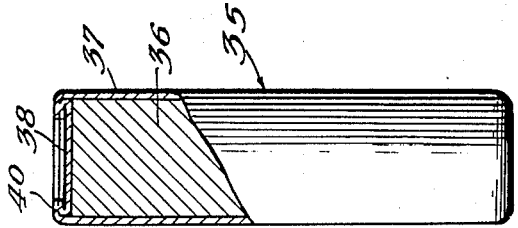
Inventor
George S. Monk
By: Robert A. Lorentz
Attorney Feb. 24, 1959 G. S. MONK 2,875,346
OVERALL OPTICAL VIEWER
Filed April 25, 1946 5 Sheets-Sheet 5

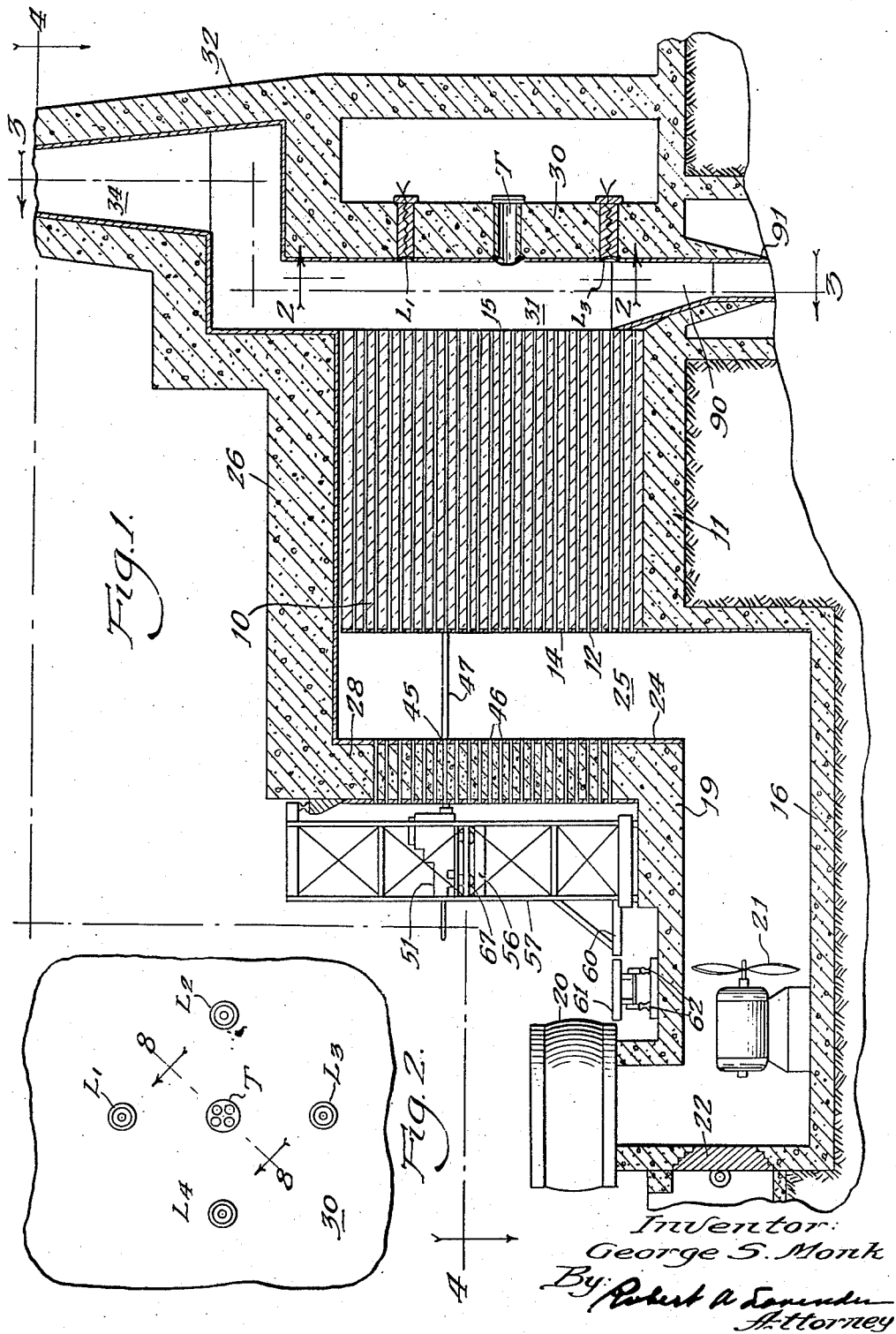

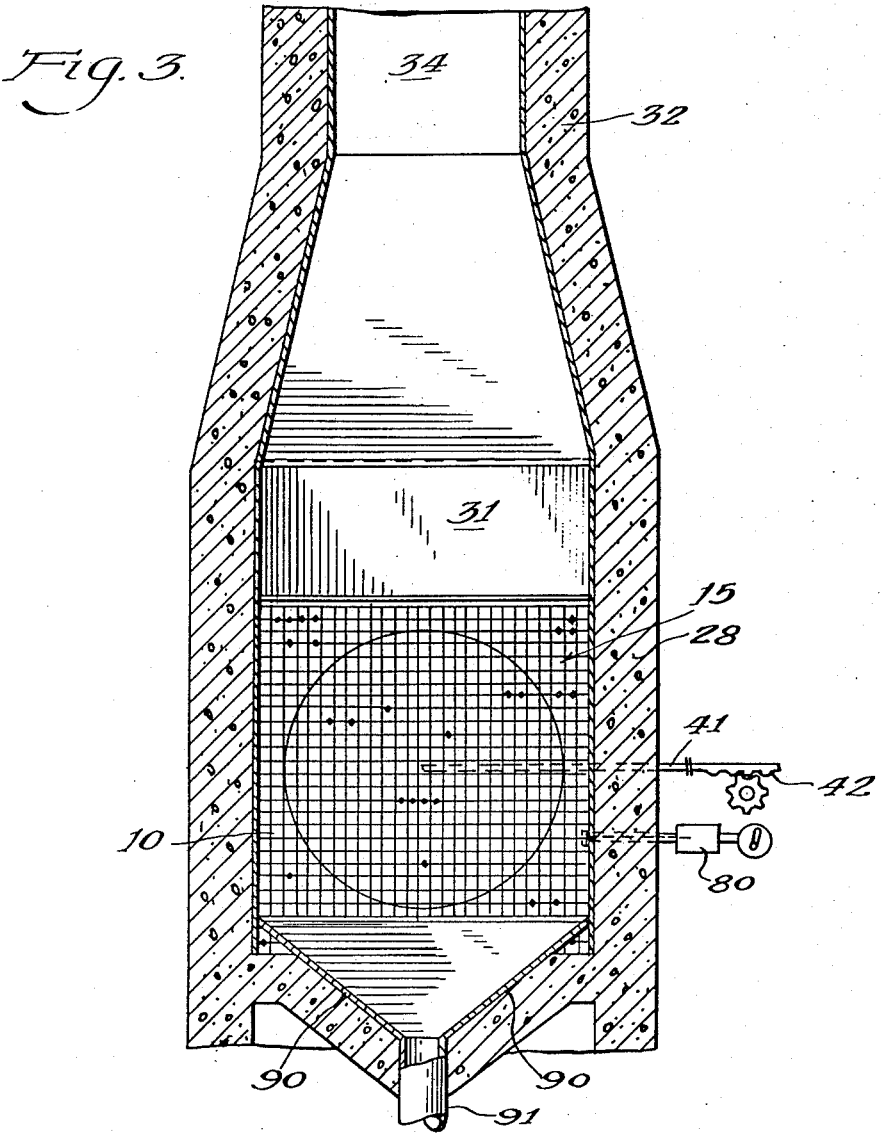

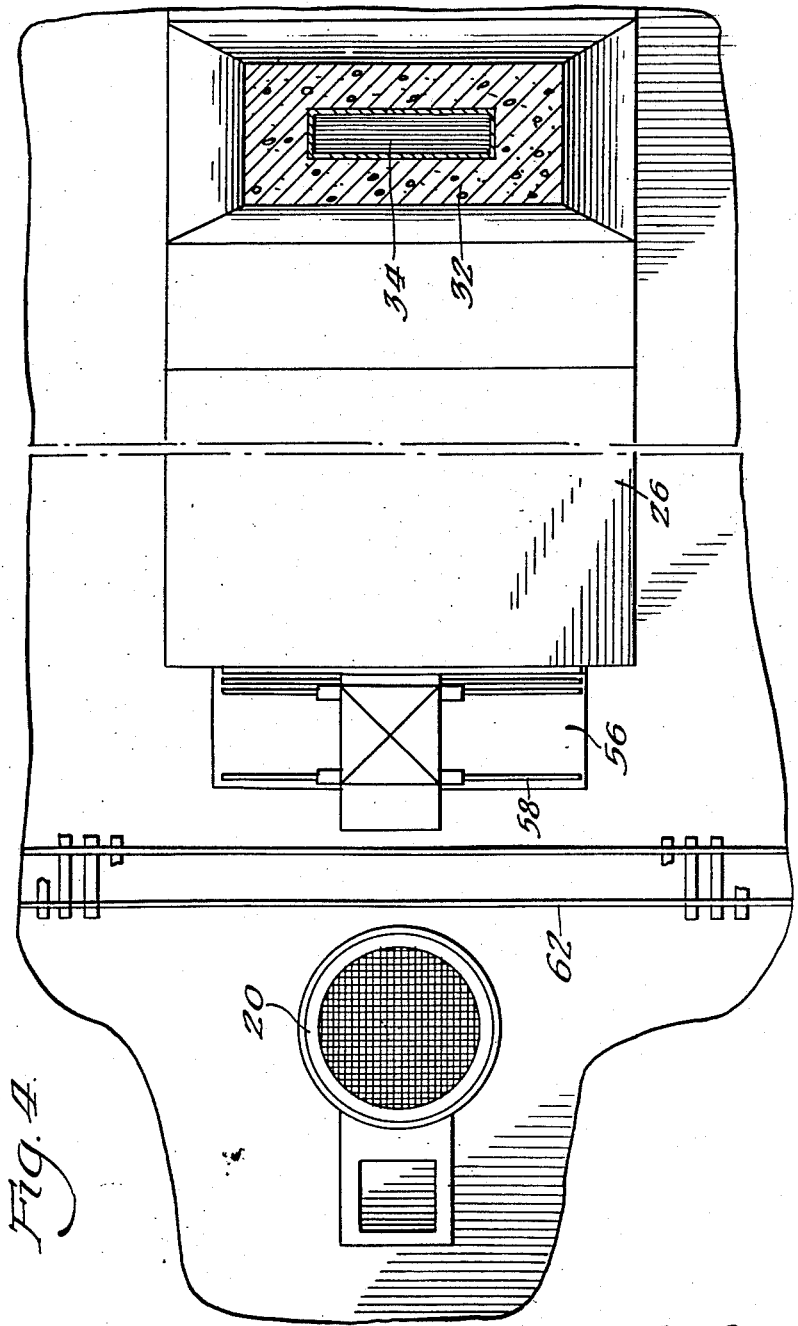

Inventor:
George S. Monk
By
Robert A. [Attorney signature]
Attorney

United States Patent Office 2,875,346
Patented Feb. 24, 1959

2,875,346
OVERALL OPTICAL VIEWER

George S. Monk, Chicago, Ill., assignor to the United States of America as represented by the United States Atomic Energy Commission Application April 25, 1946, Serial No. 664,920

8 Claims. (Cl. 250—106)

My invention relates to an optical system that is suitable for viewing objects that are in a region of relatively high radioactivity or high neutron activity. More specifically, it has reference to an optical system that will absorb penetrating radiations, such as neutrons and gamma rays, emitted by radioactive objects viewed or by radioactive objects in the vicinity of the material or objects viewed, thereby protecting personnel from the harmful biological effects of such penetrating radiations.

The present invention is particularly valuable when used in a neutronic reactor because of the very high neutron densities present and also because of the high degree of radioactivity existing inside the reactor. In order to give a clear explanation of the invention, therefore, the subject matter is illustrated in conjunction with an air cooled neutronic reactor. Specific and more complete details of such a reactor are set forth in Fermi et al. Patent 2,708,656, dated May 17, 1955. A somewhat briefer description of the same reactor is presented hereinafter.

In the past it has been proposed to view the interior of a neutronic reactor by means of an air path extending through the shield that surrounds such neutronic reactor so as to place the operator at a considerable distance from radioactive objects interiorly of the neutronic reactor, and thus provide a certain degree of protection against such radiations. Such an arrangement has several disadvantages, one being that the long optical path through the shield considerably reduces the field of view interiorly of the neutronic reactor, and another being that only a relatively small image of the radioactive objects appears. Furthermore, such an optical path of air is relatively transparent to neutrons and gamma rays, therefore exposes the operator to the hazards of these penetrating radiations.

In my application, Serial Number 577,381, filed February 12, 1945, I disclosed an optical viewer for viewing radioactive objects including objects giving off neutrons. That system was a great improvement over the long air path viewer, but still had a somewhat limited field of view.

An object of the present invention is to provide an optical viewer for viewing radioactive materials that has a field of view subtending a very large angle.

Another object of my invention is to provide a unitary optical device including a plurality of negative lenses that make possible a large field of view, and that absorbs penetrating radiations, thus making it suitable for viewing the entire discharge face of a neutronic reactor.

Other objects and advantages will become more apparent from the following description taken together with the drawings wherein:

Fig. 1 is a vertical, longitudinal sectional view of a typical air-cooled neutronic reactor including an optical viewer embodying the teachings of my invention, that may be used to view the interior of the reactor, portions of the reactor being shown in elevation;

Fig. 2 is a fragmentary elevational view taken along line 2—2 of Fig. 1;

Fig. 3 is a sectional view shown partly in elevation taken along line 3—3 of Fig. 1;

Fig. 4 is a top plan view partly in section taken along line 4—4 of Fig. 1;

Fig. 5 is an enlarged top plan view of a jacketed slug with a portion broken away and shown in section;

Fig. 6 is an enlarged fragmentary horizontal sectional view of a horizontal channel showing the slugs in plan and their relationship with the moderator and the loading car during a loading and unloading operation;

Fig. 7 is an enlarged transverse sectional view through a portion of the reactor taken along line 7—7 of Fig. 6;

Figure 8:
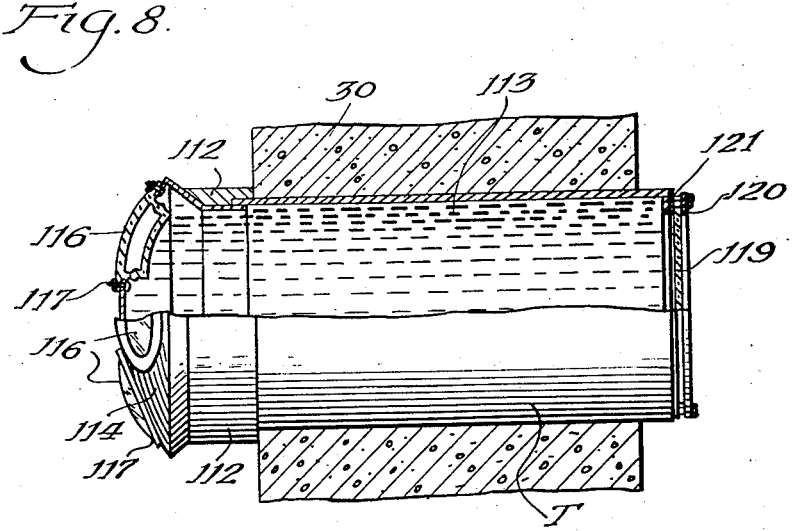
Fig. 8 is an enlarged longitudinal sectional view, partly in elevation, of the optical viewer taken along line 8—8 of Fig. 2.

The present invention is particularly, but not exclusively useful for viewing the interior of a neutronic reactor as alpha, beta and gamma radiations, as well as fast and slow neutrons are released at high intensity during operation thereof. While the neutronic reactor per se forms no part of the present invention, it is believed that a description of the theory of operation and details of a typical air cooled neutronic reactor operating by a self-sustaining chain reaction by nuclear fission of uranium by slow neutrons will be helpful towards a better understanding of the advantages of an optical system embodying the teachings of my invention.

Natural uranium may be used in the reactor since it contains the isotopes $92^{238}$ and $92^{235}$, which are in the ratio of approximately 139 to 1. Hereinafter in the specification and claims the term uranium is to be understood as referring to uranium and its chemical compositions of normal isotopic content, unless otherwise indicated by the context.

In a self-sustaining chain reaction with slow neutrons, $92^{238}$ is converted by neutron capture to the isotope $92^{239}$. The latter is converted by beta decay to $93^{239}$ and this $93^{239}$ in turn is converted by beta decay to the transuranic element $94^{239}$. By thermal neutron capture, $92^{235}$ on the other hand, undergoes nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause fission in other $92^{235}$ nuclei. While some of the secondary neutrons are absorbed by the uranium isotope $92^{238}$ leading to the production of $94^{239}$, and by other materials, enough can remain to sustain the chain reaction.

Under these conditions, the chain reaction will supply not only the neutrons necessary for maintaining the neutronic reaction, but also will supply the neutrons for capture by the isotope $92^{238}$ leading to the production of $94^{239}$.

As $94^{239}$ is a transuranic element, it can be separated from the unconverted uranium by chemical methods, and as it is fissionable in a manner similar to the isotope $92^{235}$, it is valuable for enriching natural uranium for use in other chain reacting systems of smaller overall size. The fission fragments are also valuable as sources of radioactivity.

The neutronic chain reaction referred to can be made self-sustaining in a device known as a neutronic reactor wherein uranium bodies are dispersed in an efficient neutron slowing medium or moderator, when the reactor is made to be just above a critical size where the rate of neutron generation inside the reactor is slightly greater than the rate of neutron loss from the exterior of the reactor. Under these conditions, a self-sustaining nuclear chain reaction can be obtained within the reactor having any neutron density desired, up to infinity. However, to prevent destruction of the reactor, the heat of the reaction must be controlled, and then removed by an amount providing a stable temperature in the reactor at some predetermined and controlled operating level. As the greater the number of fissions, the greater the number of neutrons are present to produce $92^{239}$ converting to $94^{239}$ by successive beta decay, the production of $94^{239}$ is accelerated by operating the reactor at high neutron density levels.

A stable temperature in a neutronic reactor composed entirely of moderator and fissionable material such as, for example, graphite and uranium metal, can only be attained at a relatively low power output as the heat generated can be dissipated only by conduction out of the reactor. Higher power outputs with greater production of $94^{239}$ require additional heat removal.

Referring to the drawings, the invention has been illustrated by reference to a graphite-uranium reactor, sometimes known as a pile.

Such a reactor broadly comprises a mass of graphite blocks closely piled or stacked into a cube 10 as shown in Figs. 1 and 3. This graphite cube may be, for example, 24 feet on a side and rest on a concrete foundation 11. The graphite cube 10 is pierced with horizontal air channels 12, of square cross section, with one of the diagonals vertical. The channels may be readily made by grooving adjacent blocks. The channels are 1.75 inches on a side and extend completely through the reactor, from an inlet face 14 to an outlet face 15. About 400–800 or more channels may be provided, and as will be later brought out, any unused channels can be plugged. Only a few of the channels are shown in the drawing for sake of clarity.

Adjacent the inlet face 14 of the cube, the foundation is continued downwardly to form the floor of an inlet air duct 16 extending outwardly. The inlet air duct 16 is completed by concrete side walls 17 and top 19.

At some distance away from the graphite cube 10 the inlet duct is turned upwardly to terminate in an air filter 20 relatively close to the surface of the ground. A fan or blower 21, here illustrated as electrically driven, is installed on the floor of the inlet duct just below the air filter, access to the fan being conveniently obtained through duct door 22, behind the fan.

The concrete top 19 of the inlet air duct is continued upwardly as an inlet end shield 24, positioned parallel to but spaced away from inlet face 14 of the cube 10 to form an inlet chamber 25 communicating with the air channels 12.

Above the inlet chamber 25 and the cube 10 the concrete is continued horizontally to form a top shield 26, and side shield 28 is built up from the foundation 11 to enclose cube 10. Shields 26 and 28 closely approach the top and side faces of the cube, to minimize air flow around the outside of the cube. A small amount of air circulation, however, may be desirable over the top and side faces to cool these faces.

At the outlet face 15, an outlet end shield 30 of concrete is provided. End shield 30 is parallel to and spaced from the outlet face 15 of the graphite cube to form an outlet chamber 31 communicating above with the base 32 of a stack 34 projecting upwardly and formed as a continuation of the concrete top side and outlet end shields. Thus the cube 10 is completely enclosed by concrete shields with a duct system operating by virtue of pressure provided by fan 21 to conduct air from close to ground level through channels 12 into the stack and then into the atmosphere well above ground level at the top of the stack. The concrete shields may be from five to ten feet thick in accordance with the maximum desired operating power of the reactor and serve as shields to reduce escape of neutrons and gamma radiation.

As a neutronic reaction will take place when uranium bodies are properly spaced in a moderator mass of a certain finite size, the above described device can be made chain reacting by placing uranium bodies in the horizontal channels in such a manner and in such an amount that a neutron reproduction ratio of slightly over unity is obtained, exclusive of all neutron losses within the reactor and from the exterior of the reactor. This reproduction ratio may be defined as the ratio of the number of neutrons gained by fission to the total number of neutrons lost by absorption in the uranium, absorption in the moderator, absorption by impurities in the reactor and by leakage from the reactor for a reactor of finite size.

Using the graphite mass as the moderator to slow fast neutrons to energies where they again are able to create fission in $92^{235}$, the device will have a reproduction ratio of unity when approximately 360 of the channels 12 in the graphite cube are each loaded with 68 aluminum jacketed uranium slugs 35 lying end to end, with a channel spacing of 8 inches measured center to center, and with the loaded channels roughly forming a cylinder. Both graphite and uranium should be of highest possible purity.

However, more than a unity reproduction ratio is required, as when the reproduction ratio is exactly unity no rise in neutron density will occur. Under such conditions the device will not develop high neutron densities or power in the form of heat. By loading additional channels i. e., making the active portion greater than critical size, however, the reproduction ratio within the reactor can be brought above unity in order that a rise in density can occur. Then this excess neutron reproduction can be obsorbed by neutron absorbing materials deliberately inserted into the reactor in order to hold the reproduction ratio at an average value of unity after a desired power output has been obtained, as a result of the initial rise in density.

Consequently, in accordance with the amount of excess reproduction ratio desired, from 450 to 600 channels may be loaded with uranium slugs. Most of the channels not loaded with uranium may be closed by inserting plugs, preferably of graphite, in such channels in order to conserve air. Some of the channels, however, in the peripheral portions of the cube may be left open for cooling of the graphite in those portions.

One preferred form of slug construction is shown in Fig. 5. Each uranium metal slug is 1.1 inches in diameter and 4 inches long covered with an aluminum jacket approximately 20 mils thick in good heat conductive relation to the uranium. The slugs weigh about 2½ pounds each.

In forming the slugs 35, the uranium portion 36 is machined to size, cleaned in trisodium phosphate and then washed in water. Aluminum or other non-fissionable metal jacket cans 37 are provided having an inside diameter somewhat larger than the uranium portion. This can 37, open at one end only, is slipped over the uranium after being cleaned in benzine and hot water. The can 37 with the uranium inside is then passed through a sizing die of 1.134 inches diameter. This die, being of smaller diameter than the 1.1 inch uranium portion plus the two 220 millimeter walls, draws the can in tight thermal contact with the uranium.

A cup-shaped cap 38 is then placed base down inside the projecting portion of the can 37 and is seam welded to the can. The projecting portion is then cut off above the seam weld 40 and the remaining projecting portion including the weld, spun over the adjacent end of the slug. Thus each jacket completely encloses and seals the uranium, preventing air from corroding the uranium and, as will be pointed out later, also preventing fission fragments created by nuclear fission at the surface of the uranium from entering the air stream.

The channels are loaded with uranium until the reproduction ratio, with neutron absorbers removed, is about 1.005 to 1.006. This means that for every two hundred neutrons starting in each neutron generation about two hundred and one neutrons are produced in the reactor over and above all losses. Under these conditions and taking into account the fact that about one percent of the neutrons of fission are delayed in their emission for a mean time of about 5 seconds, the neutron density of the reactor will double every 8 to 15 seconds. With some part of the neutron absorbers inserted but with the insertion of less than the amount of neutron absorbers required to make the reproduction ratio unity, the rise is slower. When the neutron absorbers are almost but not entirely inserted the doubling of the neutron density may take several hours. That when a desired density has been reached, the reproduction ratio can be reduced to unity so that the desired density is continuously maintained by the introduction of neutron absorbing material into the reactor.

The neutron absorbing material is introduced into the reactor by means of a control rod 41 as shown in Fig. 3. This control rod extends into the graphite cube, sliding in a channel therein and is operated from outside of side shield 28 as by rack and pinion 42. The rod is made from, or incorporates therein, an efficient neutron absorber, such as for example, cadmium or boron. A sheet of cadmium riveted to a steel strip forms a satisfactory control rod. As the depth of insertion of the rod determines the amount of neutron absorbing material inside the reactor, the critical position of the rod is where the rate of neutron absorption by the rod balances the reproduction ratio at unity. Thus, by moving the rod outwardly from the critical position the neutron density in the reactor will rise. Moving the rod inwardly from the critical position causes the reproduction ratio to fall below unity, and the reaction stops. Thus the reaction is always under control, and as the rise in neutron density is exceptionally slow as the rod approaches the critical position, manual control is possible. Other and similar rods may be provided, if desired, for rapid progression into the reactor to stop the reaction in case of failure of the control rod to stop the rise in neutron density for any reason. Such rods are termed safety rods.

During operation heat is released in the reactor in accordance with the neutron density therein. Most of the heat arises from the kinetic eneregy of the fission fragments and about 92 percent of the energy is released in the uranium. About 6 percent is released in the graphite due to neutron absorption therein and about 2 percent escapes from the reactor in the form of neutrons and gamma radiation. Consequently, the reactor can only be operated at a power dependent upon heat removal to the point where a stable temperature obtains. Otherwise, the reactor will accumulate heat to the point that the device may be damaged. Since aluminum melts at 658° C. stable temperatures below this value should be used although with jackets of other non-fissionable metals, such as beryllium, the stable temperature may be increased, although if the temperature should rise too high the uranium bodies might be damaged even when using beryllium jackets as uranium of the type used in neutronic reactors melts at about 1100° C.

A stable temperature is obtained in the device of the present invention by passing atmospheric air through the reactor, and in the specific example shown and described, the air is passed through the graphite channels and directly in contact with the aluminum jackets of the slugs. Under these circumstances the reactor can be operated continuously at 250 kilowatts electrical equivalent of heat by passing 32,000 cubic feet per minute through the reactor with a maximum temperature rise of the slugs to about 100° C., and at 500 kilowatts continuously with about 50,000 cubic feet per minute of air with a maximum metal temperature of 200° C. The output of the reactor can be stabilized at still higher powers by the use of larger fans if desired.

Having discussed generally the operation of the reactor and the temperature stabilization thereof by air cooling at elevated powers and neutron densities, I will now describe one means and method by which the reactor can be loaded and unloaded, in order that the neutron irradiated uranium can be removed for further processing such as the recovery of $94^{239}$ formed in the uranium, and fresh uranium inserted for subsequent operation of the reactor.

To accomplish loading of the slugs 35 into the various air channels 12, the concrete of the inlet end shield 24 is pierced with a plurality of loading apertures 45, as shown in Figs. 1 and 6, each aperture being aligned with the axis of slug positions in the air channels 12. Normally, during operation of the reactor, each aperture 45 is closed by a removable lead plug 46 extending through the shield 28 only.

When it is desired to load a channel with new slugs, the lead plug 46 for that channel alone is removed, and a charging tube 47 inserted, extending through the inlet and shield 24, across the inlet chamber 25 and entering the corresponding air channel 12 as shown in Fig. 5. The outer end of charging tube 47 is provided with a flanged nipple 49 shaped to engage a nipple recess 50 of a loading mechanism or magazine indicated generally by numeral 51. It will be noted that the charging tube is smaller than the air channel 12 and that air can pass through the channel being unloaded. The air should circulate during unloading, although it may be at reduced velocity.

The loading mechanism 51 is mounted on an elevator platform 56 adapted to be raised and lowered in an elevator frame 57 capable of moving along the outside of inlet and shield 24 on elevator tracks 58. Base 59 of the elevator frame is provided with a platform 60 projecting outwardly on the same level as the top of a supply car 61 travelling on supply car tracks 62. Supply car 61 is used to bring a supply of slugs to the elevator for use in the loading mechanism 51. To provide engagement and disengagement of nipple recess 50 and nipple 49, the entire loading mechanism is movable with respect to elevator platform 56 on wheels 67 running in guides 69 on the elevator platform.

The slugs are fed from magazine 51 by a reciprocating motion of plunger 54 operating in plunger bore 65. Plunger 54 may be of iron to act as a shield when inserted into charging tube 47.

In the initial loading of the graphite cube 10, loading is started with the more central air channels until 68 slugs have been placed in the guide tube 47 and connected channel. Plunger 54 is then operated to push the slugs into the channel until the outer end of the first slug is at the outlet face 15. The plunger is then withdrawn, leaving the outer end of the last slug about 16 inches from the inlet face 14, for purposes explained later.

Proceeding outwardly and preferably concentrically, additional channels are loaded, meanwhile checking the neutronic activity of the reactor. As the activity increases as the loading approaches the critical size, that is, the size where the reproduction ratio will be exactly unity, the approach to critical size can be predicted by extrapolation of observed neutron density values with respect to the volume of the cube loaded with uranium. The neutron density values can be obtained from an ionization chamber (30) (Fig. 3) for example, using any well known indicating circuit, or by measuring the radioactivity of indium foils, for example, induced by neutron irradiation when inserted into the reactor.

As the critical size is approached, the control rod 41 is inserted deeply into the reactor to prevent a self-sustaining chain reaction; and loading is continued until the desired maximum reproduction ratio of, for example, from 1.005 to 1.006 is attained. This ratio can be checked by removal of the control rod and measuring the time taken by the reactor to double its neutron density.

From this period, the reproduction ratio can be mathematically computed.

When the desired number of channels are loaded the active core of the reactor may contain from 34 to 50 tons of uranium, and will be ready for operation. Graphite plugs for the unused air channels may be loaded in a manner similar to that described for the uranium slugs.

It will be noted that on 4 sides of the graphite cube excess graphite will be present. On the fifth side, i. e., at the inlet face, graphite will also extend 16 inches beyond the uranium. On the remaining side, i. e., the outlet face no graphite extends beyond the uranium. Thus 5 sides of the active portion (the uranium bearing portion) are surrounded by graphite. This graphite constitutes a reflector and reduces the amount of uranium required to reach critical size.

Graphite and other neutron moderators can be used around the active portions of a neutronic reactor, as such materials scatter neutrons passing through them and thereby change the direction of the neutrons. Statistically, due to the scattering action, some of the neutrons that otherwise would be lost to the active portion are returned to it, thus reducing critical size. In graphite-uranium reactors having roughly a spherical shape for the active portion there can be a reduction of 3 to 3½ feet in diameter of the active portion when it is surrounded by a layer of graphite from 3 to 5 feet thick. In the present instance the reduction in size is slightly less as only 5 sides of the active portion are surrounded with the reflecting layer.

It will be noted that more air channels are originally provided in the graphite cube than are required for the disposition of the uranium containing slugs. The manner in which the uranium is disposed in the graphite is known as the geometry of the system, and this geometry may be varied to suit conditions, for example, the system as described may be said to have rod geometry with cylindrical loading, as the end to end relationship of the slugs forms, in effect, a long rod of uranium. Further, the use of full length rods in all channels concentrically arranged around the center of the active portion, gives that portion a generally cylindrical shape.

Lump geometry may also be used in the reactor, and is accomplished by separating the individual slugs by graphite rods, for example 4 inches long. In this case additional channels will be loaded to bring the amount of uranium almost to the same value as that used in the rod geometry, although the lump geometry is slightly more efficient than rod geometry.

Furthermore, a spherical shape is somewhat more efficient for the active portion than a cylindrical shape, and can be approached with either rod or lump geometry by shortening the extent of uranium loading in the channels as the peripheral concentric layers are added, until an approximate sphere is formed. A suitable compromise is the use of one or more concentric rings of outer channels around a cylindrically loaded central portion, with only half the number of slugs in the outer channels and disposed with the ends of the slug row equally distant from the ends of the fully loaded rows. Other arrangements will be apparent to those skilled in the art.

After the reactor is loaded the fan is started and the control rod is withdrawn until a rise in neutron density to a desired power output where a stable temperature in the reactor is attained. The control rod is then progressed into the reactor until a neutron balance is obtained with the reproduction ratio at unity, thus maintaining the chain reaction at the desired operating power. Small variations from the unity reproduction ratio will occur during operation, due to temperature variations of the cooling air, and to change in barometric pressure and to minor variations in air pressure delivered by the fan. However, such variations are compensated by slight inward or outward corrective movements of the control rod, either by hand in response to indicated variations in neutron density, or automatically by direct linkage of the control rod to the output of the ionization chamber 80. However, such automatic control is not part of the present invention.

During operation of the reactor, the air passing through the reactor becomes radioactive due to the fact that it is subjected to intense neutron irradiation. Investigation has proved that the only significant radioactivity present in the air after having passed through the operating reactor is that of argon[41], having a 110 minute half-life. At 500 kilowatt power, however, this activity is present in the exhaust air to the point that it would be biologically dangerous to operating personnel unless highly diluted during its radioactive decay. For that reason the air passing through the operating reactor is not delivered to the atmosphere at ground level but is exhausted at a substantial distance above ground, such as for example from the top of a 200 foot stack, with the result that when and if any of the radioactive argon[41] reaches ground level it is so dispersed in and diluted by fresh atmospheric air that less than 0.1 Roentgen per day will be received by any persons on the ground, either close to or away from the stack. Thus, the air is only passed once through the reactor and does acquire excessive radioactivity.

The sole presence of the above noted type of radioactivity however, it predicated on the use of the jackets sealed around the uranium bodies. Aluminum is preferred for the jackets, as aluminum has a relatively low neutron capture capability and, consequently, can be used in substantial amounts in the reactor without absorbing or capturing sufficient neutrons to prevent a self-sustaining chain reaction from occurring. Aluminum also corrodes very slowly in hot air.

The jackets have two functions, both of which reduce radioactivity of the cooling air. The first is to prevent oxidation of the uranium. While considerable oxide could be tolerated in the reactor itself if the uranium were to be used in unprotected condition, some of the oxide particles would be picked up by and exhausted in the cooling air. As these particles would be highly radioactive and relatively heavy, the proper dispersal thereof would be a difficult problem.

In addition, if operation should be accomplished in the reactor with bare uranium, fission fragments from nuclear fissions occurring on the surface of the uranium would also be projected into the air stream and would be carried out by the air stream. These fragments are exceptionally radioactive and could not safely be dispersed into the atmosphere. When jackets are used, these fragments are, however, stopped by the jackets and cannot enter the air stream to any substantial degree.

Thus, the jackets prevent corrosion of the uranium and prevent fission fragments and corrosion products of uranium from entering the air stream. As fission fragments will pass through an extremely small hole, one method of monitoring the reactor for jacket failure, such as for example, a weld crack is to monitor the radioactivity of the stack gas. If the stack gas shows any substantial radioactivity other than that of argon[41] then it is clear that a jacket failure has occurred. Such monitoring of the stack gas is normally a routine procedure of an operating air cooled reactor, but forms no part of the present invention.

After operation of the reactor for a sufficient length of time for an amount of 94[239] to be created sufficient for chemical separation, such as for example 100 days at 500 kilowatts, the reactor is shut down by inserting the control rod fully into the reactor. After about one half hour's wait, during which all delayed neutron emission will have ceased and the more violent radioactivity subsided, the reactor may be unloaded.

The unloading may be accomplished in two ways, either by using the plunger to push the slugs out of the channels so that they fall by gravity out of the outlet face 15, or by using the plunger to insert new slugs in the channels, each slug so inserted pushing an irradiated slug out of the outlet face 15. In the first instance the graphite cube will be left empty after unloading. In the second instance the insertion of new slugs is continued until all or a predetermined part of the irradiated slugs are out of the reactor, having been replaced by fresh material. Thus, the reactor is left ready for the next run. Under ordinary circumstances the latter manner of unloading is preferred.

In either case the slugs drop by gravity from the outlet face into outlet chamber 31, falling on to two angularly disposed pad plates 90 positioned to intersect the falling slugs, in the bottom half of outlet chamber 31 as shown in Figs. 1 and 2. The two plates slant to a centrally disposed outlet pipe 91 extending downwardly through foundation 11.

In order that there be no material damage to the jacketing of the slugs, plates 90 are preferably padded with a soft material that does not deteriorate under neutron irradiation, and that will be able to withstand the slug impacts. A satisfactory pad has been found to be ¼ inch cotton duck on felt laid on wood backed by steel. Combinations of various synthetic elastic materials have also been found satisfactory.

The irradiated slugs are dropped through outlet pipe 91 into coffins (not shown). These coffins may then be taken to a soaking pit (not shown) to remain until the radioactivity has decayed to a point where the slugs can be submitted to chemical removal of the products formed therein by irradiation. After 100 days' operation the aging period may be about 30 days.

Removal of the irradiated slugs under the conditions specified is performed for two reasons. Firstly, the slugs are so highly radioactive that they cannot be safely approached by personnel without adequate shielding being interposed, and, secondly, for some time after removal from the reactor this radioactivity is so intense that self absorption of the emitted radiations causes self heating of the slugs sufficient to melt the slugs if not cooled in some manner. By unloading during maintenance of the air stream, by dropping the slugs at once into water, and keeping the slugs in water until the more violent radioactivity has subsided, melting is prevented, as the slugs are cooled as they boil the water in which they are immersed. The slugs are then stored or aged under water until ready for chemical treatment as for example, for thirty days.

In the course of the above described reloading operation any number of faulty operations may occur that may be detrimental to continued operation of the pile. For example, large pieces of graphite might become loose from outlet face 15 and clog up the outlet pipe 91. Or perhaps jamming of the slugs may occur in one of the channels 12, or one or more push rods 54 may be inadvertently left therein. Or perhaps by accident one or more of the centrally disposed channels 12 will not contain uranium slugs or a sufficient number of uranium slugs for efficient operation. Another possibility is that of an observable rupturing of one or more aluminum jackets surrounding the uranium slugs 36, which, if not replaced, may cause abnormal radioactivity of the air used as a coolant resulting in pollution of the air in the territory surrounding the neutronic reactor even though the stack is used. Biologically this would be a menace to the health of the people in such territory.

All of the above named faults and many others may be readily detected before or while the reactor is in operation by a viewing tube constructed in accordance with the teachings of my invention and so positioned through a shield of the neutronic reactor as to make it possible to observe any particular internal portion of the reactor desired. For example, referring to Figs. 1 and 2, viewing tube T with associated lamps $L_1$, $L_2$, $L_3$ and $L_4$ may be used to observe different sections of outlet face 15.

Figure 9:
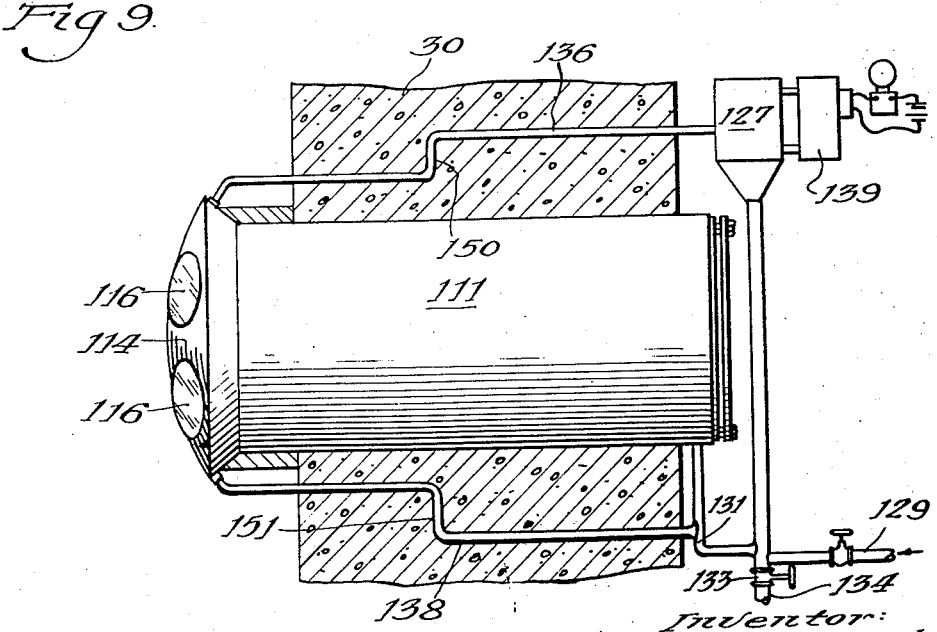
Fig. 9 is a somewhat diagrammatic showing of the viewer of Fig. 1 illustrating the water supply and alarm system.

Referring to Figures 8 and 9, the optical viewing tube T, made of steel or other suitable material, is surrounded by an annular ring 112 of lead or other material that is substantially opaque to gamma rays. In order to completely shield the hole in the concrete shield with radiation absorbing material, tube T is filled with a transparent liquid 113 that absorbs penetrating radiations, such as gamma rays and particularly neutrons, that may be emitted by the radioactive objects viewed. Liquid 113 may comprise water or other liquid solution having a slightly higher index of refraction than water, such as, for example, a zinc chloride solution. The advantage of using a zinc chloride sodium nitrate or lead nitrate solution or some other solution of a compound having a relatively high density, more specifically a relatively high atomic number, such liquids have a greater absorption for gamma rays than ordinary water and therefore offer better shielding from such radiations. The hydrogen content of the water effectively absorbs neutrons entering the tube.

In order to minimize the possibility of discoloration of liquid 113 as the result of continued exposure to penetrating radiations, the interior surface of tube T is preferably coated with a material to protect it against corrosion. For example, if tube T is made of steel it may be galvanized interiorly to prevent oxidation of the steel by the oxygen contained in water, and the zinc in turn, may be waxed to make the steel even more resistant to chemical change.

The viewing tube T may be of welded steel construction having an enlarged spherically shaped end 114 toward the active portion of the reactor. Several negative lenses 116 of circular horizontal cross section preferably each having a field of about 150°, each having a large field of view are mounted in the spherical 114 of the tube T so that the axes of the lenses preferably intersect the tube axis at a common point. Suitable gaskets and rings 117 seal the lenses 116 to prevent loss of the liquid 113. While the field of view of all the lenses 116 will overlap in the center of the active portion of the reactor face, each of the lenses will cover different portions more remote from the axis of the viewing tube T. The lenses 116 are conveniently of the dual type in order that the thickness of each portion of the lens may be fairly uniform.

The lenses 116 are preferably made of transparent organic plastic material, such as, for example, polymerized methyl methacrylate, as such materials are not as subject to being discolored as glass is when subjected to continued exposure to penetrating radiations. Generally speaking curved window 116 or lens is preferably made of a material that does not contain metallic elements, inasmuch as gamma radiation causes molecular structural changes, particularly in optical glasses resulting in absorption of visible light. Apparently, there is a looser bond of the electrons forming metallic molecules than those forming hydro-carbon molecules, and consequently, in the former, there is a greater likelihood of displacing electrons as the result of irradiation by penetrating rays. The electrons so displaced absorb visible light and cause discoloration. On the other hand, plastic materials, particularly the transparent hydro-carbons, are generally free from metals that tend to cause discoloration such as, for example, silicon and iron. While gamma rays may effect small changes in the molecular structure of plastics, causing release of electrons, there is apparently a much firmer bond tending to urge return of such released electrons to their original position in the molecular structure rather than to allow the electrons to remain free and absorb visible light and thus cause discoloration. For this reason, plastics are particularly suitable since they are resistant to discoloration even after a considerable time of exposure to penetrating rays.

While the structure of Figs. 8 and 9 may be of any desired dimension, a typical set of dimensions will illustrate the invention more clearly. If the overall length of the tube T is approximately seven and one half feet over-all and the diameter through the concrete wall 30 is three feet, then the field of view at the window 119 can be in excess of a hundred and twenty degrees measured from a point adjacent the lenses 116, or sufficiently great to enable a single viewer to provide a visual coverage of the entire discharge force of the neutronic reactor.

A flat glass plate 119 is attached to the other end of tube T by means of rings 180 and 121, ring 121 being welded to the tube T. Suitable gaskets prevent leakage of the liquid 113. Glass plate 119 serves as a window adjacent which an observer positions his eye for viewing.

The lamps $L_1$, $L_2$, $L_3$ and $L_4$ shown in Fig. 1 may be of the type described in my aforementioned application Serial No. 577,381, filed February 12, 1945, and are removable. Bulbs are mounted in reflectors carried in removable lead cylinders through which electrical lead-in connectors pass. A tortuous path is provided through the lead cylinders to prevent passage of gamma rays.

The tube T may be filled with liquid either through a supply reservoir 127, as seen in Fig. 9, or from a filtered water supply line 129. The tube T preferably is tilted slightly from horizontal to provide drainage toward the shielded end. The reservoir is connected to the tube T through pipes 130 and 131. Drainage is provided through valve 133 and outlet pipe 134. A pipe 136, that is offset at 150 within the concrete wall 30 to prevent escape of gamma rays, serves to bleed air from the upper portion of the enlarged end 114 of the tube T. Likewise complete drainage of the enlarged end 114 is afforded through a pipe 138, also offset at 151 within the concrete.

A liquid level responsive switch 139, in communication with the reservoir 127, serves to energize an electric circuit to sound a suitable located alarm 140 when the liquid level in the system drops below a predetermined level, thus minimizing the possibility of dangerous radiation passing through the shield.

Additional protection is afforded by the provision of a lead door (not shown) that may be swung into a position covering the viewing end of the tube T when it is not in use.

Thus it will be seen that I have provided an efficient optical system that is suitable for viewing irradiated objects, such as, for example, objects interiorly of a neutronic reactor, which optical system includes materials that absorb penetrating radiations otherwise harmful to the operator and that do not appreciably discolor as a result of extended exposure to penetrating radiations. Furthermore, I have provided in such an optical system a negative lens system giving a very wide angle of view.

While the theory set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

It should be noted that equivalent structures and materials within the scope of my invention may be readily suggested to others skilled in the art after having had the benefit of the teachings of the present specification. For example, while I have shown an optical system with relation to an air-cooled neutronic reactor, such optical system may be used, instead, in a liquid cooled neutronic reactor of entirely different construction than that shown in Fig. 1. In fact, my optical system is useful for viewing radioactive objects wherever it is desired to interpose a shield between the operator and such objects.

The invention should not be restricted except insofar as set forth in the following claims.

What is claimed is:

1. An apparatus for viewing radioactive material comprising a shield spaced from the material, a tube through said shield, a convex head mounted in said tube nearest the radioactive material, a plurality of negative lenses mounted on said head with their axes substantially intersecting within said tube, and a transparent member closing the opposite end of said tube, the interior of said tube being filled with a liquid transparent to light and opaque to neutron and gamma radiations.

2. An apparatus for viewing radioactive material comprising a shield spaced from the material, a tube through said shield, a convex head mounted in said tube nearest the radioactive material, a plurality of negative lenses mounted on said head with their axes substantially intersecting within said tube, and a transparent member closing the opposite end of said tube, the interior of said tube being filled with a liquid transparent to light and opaque to neutron and gamma radiations, and means for varying the quantity of liquid in said tube.

3. A radiation absorbing optical system comprising a tube filled with a material transparent to light and opaque to neutrons and gamma radiations, a window at one end of said tube, and a plurality of negative lenses at the opposite end of said tube, said lenses being mounted so that their axes are in angularly disposed relationship.

4. A radiation absorbing optical system comprising a tube filled with a material transparent to light and opaque to neutrons and gamma radiations, a window at one end of said tube and negative lenses at the opposite end of said tube, said lenses having angularly disposed axes.

5. A radiation absorbing optical system comprising a tube filled with material transparent to light and opaque to neutrons and gamma radiations, a window at one end of said tube and a plurality of negative lenses at the opposite end of said tube, said lenses being mounted so that their axes are in angularly disposed relationship with their axes intersecting the tube axis at a common point.

6. A radiation absorbing optical system comprising a tube filled with a material transparent to light and opaque to neutrons and gamma radiations, a window at one end of said tube and a plurality of negative lenses at the opposite end of said tube, said lenses being mounted so that their axes are in angularly disposed relationship with their axes intersecting the tube axis at a common point, means for varying the quantity of liquid in said tube, and indicating means responsive to the level of radiation absorbing liquid.

7. A radiation absorbing optical system comprising a tube filled with a material transparent to light and opaque to neutrons and gamma radiations, a window at one end of said tube and a plurality of negative lenses at the opposite end of said tube, said lenses being mounted so that their axes are in angularly disposed relationship, said liquid comprising a zinc chloride solution.

8. A radiation absorbing optical system comprising, in combination, a tube filled with a zinc chloride solution, a window at one end of said tube, a plurality of negative lenses at the other end of said tube, said lenses being constructed of polymerized methyl methacrylate, and mounted with axes angularly disposed with respect to each other.

References Cited in the file of this patent

UNITED STATES PATENTS

| Number | Name | Date |
| --- | --- | --- |
| 1,419,241 | Edwards | June 13, 1922 |
| 1,565,590 | Ritterrath | Dec. 15, 1925 |
| 1,657,776 | Wolfe et al. | Jan. 31, 1928 |
| 1,866,306 | Hutton | July 5, 1932 |
| 2,041,290 | Jackson | May 19, 1936 |
| 2,146,662 | Van Albada | Feb. 7, 1939 |
| 2,169,874 | Hardt | Aug. 15, 1939 |
| 2,200,466 | Cristiani et al | May 10, 1940 |
| 2,406,148 | Jany | Aug. 20, 1946 |

FOREIGN PATENTS

| Number | Country | Date |
| --- | --- | --- |
| 395 | Great Britain | Jan. 6, 1900 |